May 12, 1953          B. E. PREVOST          2,638,282

SHORT CORE SHAFT

Filed Sept. 3, 1948          2 Sheets-Sheet 1

INVENTOR.
Bruno E. Prevost
BY Pearson + Pearson

May 12, 1953   B. E. PREVOST   2,638,282
SHORT CORE SHAFT
Filed Sept. 3, 1948   2 Sheets-Sheet 2

INVENTOR.
Bruno E. Prevost
BY
Pearson + Pearson

Patented May 12, 1953

2,638,282

UNITED STATES PATENT OFFICE 2,638,282

SHORT CORE SHAFT

Bruno E. Prevost, North Andover, Mass., assignor to John W. Bolton & Sons, Inc., Lawrence, Mass., a corporation of Massachusetts Application September 3, 1948, Serial No. 47,570

1 Claim. (Cl. 242—72)

This invention relates to an improved shaft member for the support of heavy rolls of sheet material wound on tubular cores.

It has been customary in paper mills to arrange a plurality of such core wound paper rolls on what is called a backstand, the backstand comprising two upright frames each carrying bearings for the solid shaft passing through each core. Tapered sleeves or thimbles are slid onto the solid shaft and forced into each end of each core with a drive fit, sometimes damaging the roll. The thimbles are fixed to the shaft by a set screw when the roll is properly aligned on the shaft. The web from each roll is then run through guides to knives which cut a plurality of superimposed sheets therefrom.

Installation of such solid shafts has required two men who must lift and guide the shaft into the core, center the core on the shaft and drive-fit the thimbles. Thereafter it is difficult to remove the shaft, great space is required to store the shaft and roll and the assembly is very heavy to handle.

Considerable space is required to insert a long shaft in a wide roll and after insertion, the rolls cannot conveniently be stored on end but must be piled horizontally by the use of chocks or stops at each end at the bottom of the pile.

The object of my invention is to provide a support at each end for each paper roll, consisting of a comparatively short tubular stub shaft forming a journal at one end and having its other end releasably anchored and centered within the core. Merely using two short cylindrical shafts of the same diameter as the core, one at each end thereof, would not be satisfactory because of the difficulty and friction when inserting them. My new shafts are of somewhat less diameter than the diameter of the interior of the core and each has a resilient anchoring member comprising a sleeve or collar at the inside anchoring end which can be expanded from the journal end by turning a shaft with a screw thread on its end to squeeze the sleeve or collar so as to make a tight and centered fit with the inner surface of the core. I call this expandable member, the principal anchoring or centering element, of my device.

I overcome any tendency to sag by using a secondary anchoring or centering member between the journal and the principal anchoring member which consists of another resilient sleeve or collar. The location of the secondary anchoring member is determined by a positioning member fastened to the shaft and which preferably is an integral or fixed annular flange. My anchoring and centering members as well as a spacing sleeve between them, are all slidable on the shaft and can be removed from the anchor end of the shaft for replacement when necessary due to wear and tear or when it is desired to substitute parts of larger or smaller size.

The positioning member of my device serves as a fixed stop to position the end of a core and also the roll. It could be a bolt, pin, flange or lug or it could be a collar slidably adjustable on the shaft by means of a set screw or spring pressed catch. I prefer, however, to use an integral annular flange and to make the same of sufficient diameter not only to position the slidable anchoring assembly but to act as a stop or guide for the inner windings of the rolled web thus limiting any tendency to axial movement thereof.

The bearings of each backstand are all preferably of the same size so that the journal portion of each of my stub shafts, used with that backstand is of the right size to fit any bearing. The anchoring portion of each of my shafts, however, because of the resilient anchor members, can be expanded to fit the inside of cores of different sizes within the limits of expansion of the resilient sleeves. To accommodate cores of even larger diameters, the nut and pressure head, at the anchoring end of my device, can be removed, the anchoring elements slid off the shaft and other larger elements installed on the shaft as required or desired.

By providing two points of support to my anchor shaft, namely the clamping fit of the resilient anchor member within the core and the push fit of the secondary anchoring or centering member at the mouth of the core, there is no sagging at the centre of the roll and no lateral creep to either side of the backstand.

My anchor shafts are particularly useful with backstands of the type described in my copending application, dated April 5, 1948, on "Backstand for Rolls of Paper," Serial No. 19,134, now Patent No. 2,599,720, wherein the upright back and front side frames are arranged to be moved toward and away from each other to accommodate rolls of different widths on cores of different lengths.

A particularly useful feature of my device is that one anchor shaft can be inserted in a roll and tightened in place, whereupon that roll can be hoisted and carried about the paper mill by grappling means attached to the journal end of the shaft. Since there would be no projecting shaft at the other end, the roll can be set down on the floor in a vertical position to occupy much less space and to protect the surface of the web from dirt and other damage. Each roll is accessible without disturbing others which is not the case with horizontally stacked rolls having solid shafts projecting from each end.

Any number of tiers of rolls with any number of rolls in a tier can be put in place and the cores removed after unwinding.

In the drawings, Fig. 1 is a front elevation of one form of a backstand with one end of one roll in section to show my improved shaft in place.

Figure 1:
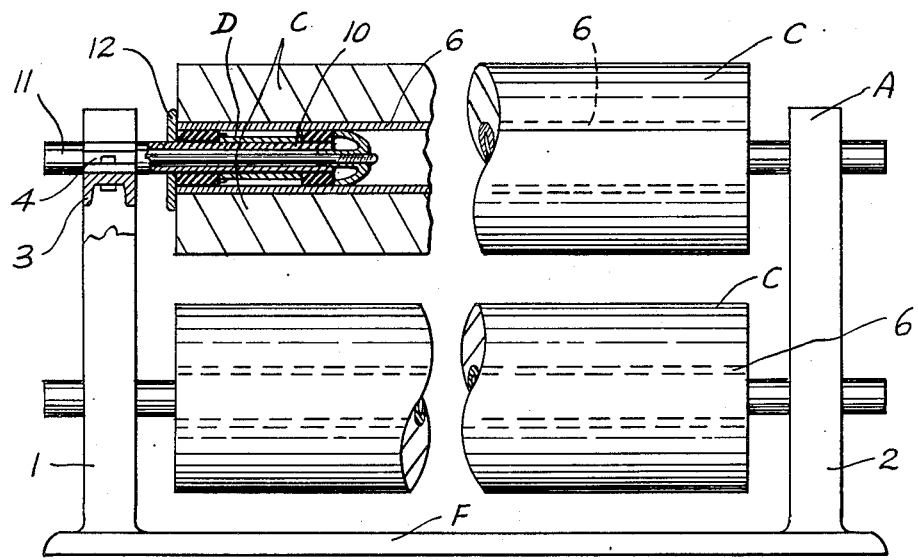

As shown in Fig. 1, F is the base of a backstand A having upright members 1 and 2 connected by horizontal channel beams 3, 3, each of which carries a plurality of bearings 4, 4. C represents a roll of sheet material such as paper, wound on a hollow core or tube 6 which may be of metal, paper or any suitable material.

In each end of each core 6, the anchor section 10 of my tubular anchor shaft D is inserted, while the other section 11, called the journal section is carried in a bearing such as 4. Anchor shaft D is shown as having an annular flange 12, integral therewith, and located between the anchor and journal sections.

Anchor shaft D comprises a hollow tube 13, having a fixed partition or guide piece 14, inside the journal end 11, in the centre of which is an opening 15 for operating rod 16. Operating rod 16 at its outside end 17 is squared for turning by any convenient means such as a crank or wrench and is threaded at its other end at 18 to engage a nut 19 located in a recess in a pressure head 20.

Head 20 has a recess 21 for nut 19 and is guided on operating rod 16 by a cylindrical passage 22 in which the rod slides and is guided on the inner surface of tube 13 by its cylindrical tail portion 23. Head 20 has inwardly projecting keys 24 operating in slots 25 in tube 13 to prevent the head from revolving when operating rod 16 is turned.

I provide a resilient sleeve or collar 26, slidable on tube 13 of shaft D, which I call the principal anchoring member and a similar resilient sleeve or collar 27 in contact with flange 12 which I call the secondary anchoring member. Resilient members 26 and 27 are preferably of "neoprene" but may be of rubber or any resilient material each capable of springing back to its original shape after being deformed under pressure. A spacing sleeve 28 is provided between the two resilient members 26 and 27 and might be of uniform cross section but preferably has end flanges such as 29 and 30.

The anchor section 10 of shaft D is inserted in core 6 with the resilient members 26 and 27 uncompressed until the end of annular flange 12 strikes core 6 and roll C. End 17 of rod 16 is then turned, causing nut 19 to exert pressure on head 20, thereby causing part 92 of head 20 to press against resilient member 26. The compression of member 26 causes it to press against flange 30 of sleeve 28 which in turn compresses member 27. Member 27 is thus expanded radially, until it makes a push-fit with the inner surface of core 6 and further pressure by head 20 causes the principal anchoring element 26 to be squeezed between flange 92 and flange 30 of sleeve 28 and to expand to a very tight fit inside of core 6.

When cores of larger diameter are to be used, I can remove head 20 by unthreading nut 19, slide members 26, 27 and sleeve 28 off the anchor end of the shaft and replace them with similar members of larger or smaller diameter.

Figure 4:
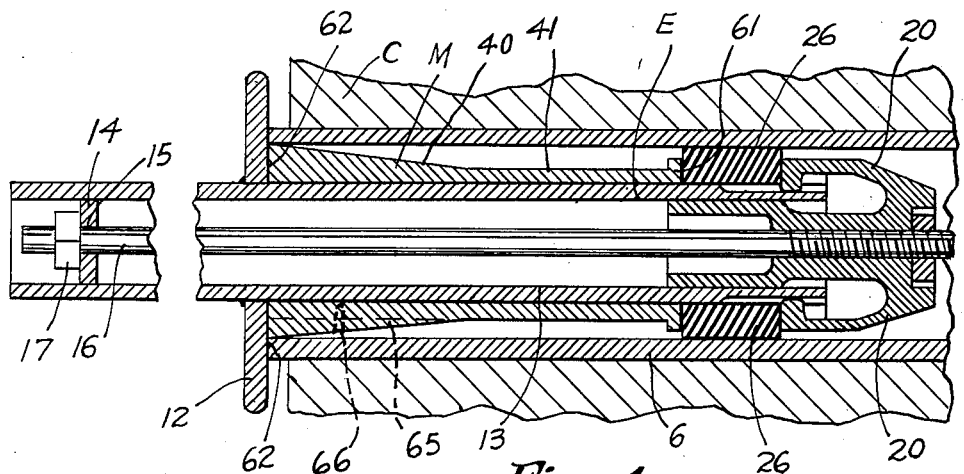
Fig. 4 is a view similar to Fig. 2 of a modified form of my device and Fig. 5 is a view similar to Fig. 2 of still another form of my device.

As shown in Fig. 4, in place of the resilient member 27 and squeezing sleeve 28, I can use a shaft E having a member or thimble M with a tapered section 40 and a spacing and centering section 41. Thimble M is slidable on shaft E and has an interior flange 61 against which resilient member 26 rests and its other end 62 rests against annular flange 12 so that the principal anchoring member 26 is compressed between flange 61 and head 20. The tapered section 40 and spacing section 41 of thimble M can be all one piece or in two separate parts if desired.

Shaft E is inserted in a core 6 until the tapered section 40 of thimble M makes a push fit with the mouth of the core, preferably at such a point that the end of roll C is also in contact with annular flange 12. When core 6 has been thus centered on shaft E, the operating rod 16 is turned and resilient member 26 expanded to make a tight fit within the core.

As shown in dotted lines, 40 may be welded at 65 to section 41 or it might be held by a set screw 66. When a larger or smaller core is to be used, the head 20, member 26 and thimble M are all or some are removed and replaced by others which may be larger or smaller.

Figure 5:
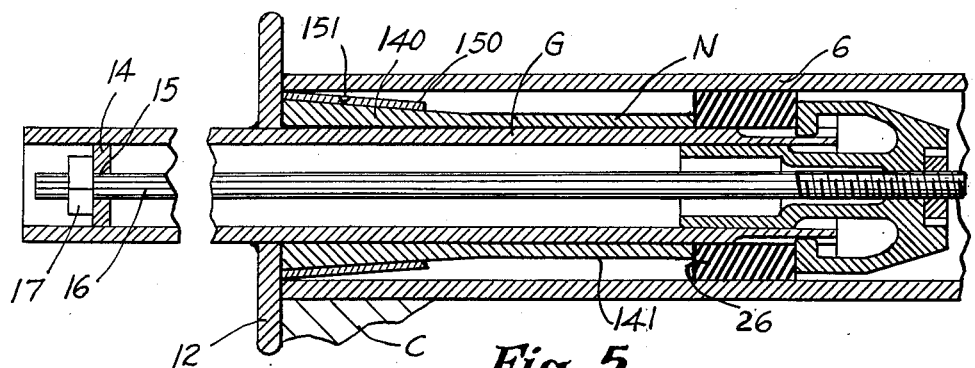

In Fig. 5, a further modification is shown in which a tubular shaft G carries a thimble or sleeve N with a tapered section at 140 and a spacing section 141 similar to that shown in Fig. 4. A tapered sleeve 150, however, is provided which is slidably removable from thimble N and which may be fixed in the correct position for fitting a core 6 by a set screw 151. 150 may be of metal as shown, but preferably is of a resilient material such as rubber or plastic. A number of tapered sleeves such as 150 are provided with inside diameters of the same size and outside diameters of gradually increasing size in order that an operator may select an appropriate sleeve to fit each new core and yet to permit roll C to bear against annular flange 12.

Figure 2:
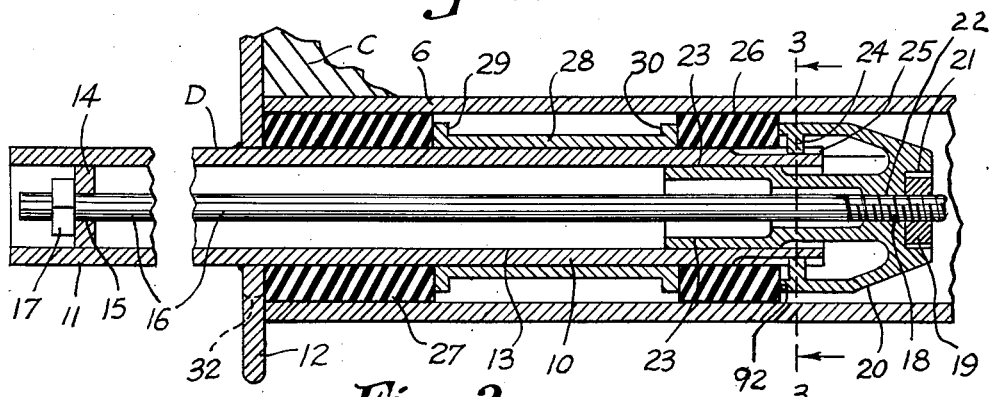
Fig. 2 is a front elevation, in section, of my shaft in a core of a paper roll.
Figure 3:
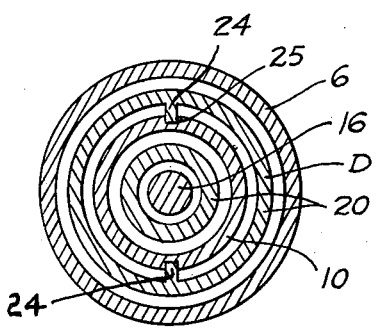
Fig. 3 is a sectional view on line 3—3 of Fig. 2.

In the preferred construction shown in Figs. 1, 2 and 3, resilient member 27 is longer than member 26 so that it will not expand as much. This is because its principal purpose is centering rather than anchoring, and the anchoring effect of member 26 is sufficient.

Figure 6:
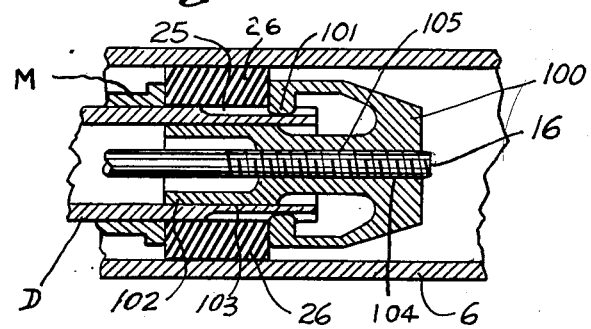
Fig. 6 is a view similar to Fig. 5 of a modified form of my device.

A modification is shown in Fig. 6 in which I provide a head 100 with inwardly projecting keys 101 guided in key slots 25 in the exterior of a shaft such as D, E, or G. A tail portion 102 is provided to fit the interior 103 of the tubular shaft and an opening 104 is provided for a threaded shaft 16. Instead of a recess 21 and a threaded nut 19, however, internal threads 105 are located in the opening 104 of head 100 thus causing the head to exert pressure on a resilient member 26 as rod 16 is turned.

I claim:

In a releasable anchor shaft for use in supporting one end of a cylindrical core, said shaft having a journal portion and an anchor portion, the combination of an annular positioning flange fixed on said shaft between said anchor and journal portion; an elongated centering sleeve of resilient material slidably mounted on said shaft and abutting on said flange; a non compressible spacing sleeve slidably mounted on said shaft and abutting on said centering sleeve; an anchoring sleeve of said resilient material slidably mounted on said shaft and abutting on said spacing sleeve, said anchoring sleeve being of less length than, but of substantially identical radial cross section to, said centering sleeve; a pressure head, mounted at the end of the anchor portion of said shaft and abutting on said anchoring sleeve and means, operable from the journal end of said shaft, for moving said pressure head toward said positioning flange.

BRUNO E. PREVOST.

References Cited in the file of this patent

UNITED STATES PATENTS

| Number | Name | Date |
| --- | --- | --- |
| 163,217 | Lawson | May 11, 1875 |
| 1,878,264 | Claybourn | Sept. 20, 1932 |
| 1,945,621 | Shaw | Feb. 6, 1934 |
| 2,066,659 | Templeton et al. | Jan. 5, 1937 |
| 2,365,980 | Thomas | Dec. 26, 1944 |
| 2,563,994 | Dougherty | Aug. 14, 1951 |
| 2,564,746 | Bauer | Aug. 21, 1951 |

FOREIGN PATENTS

| Number | Country | Date |
| --- | --- | --- |
| 269,699 | Great Britain | Apr. 28, 1927 |
| 489,583 | Germany | Jan. 18, 1930 |